H. A. PALMER.
LEG MOUNT FOR CASTERS.
APPLICATION FILED DEC. 29, 1913.
1,087,050.
Patented Feb. 10, 1914.
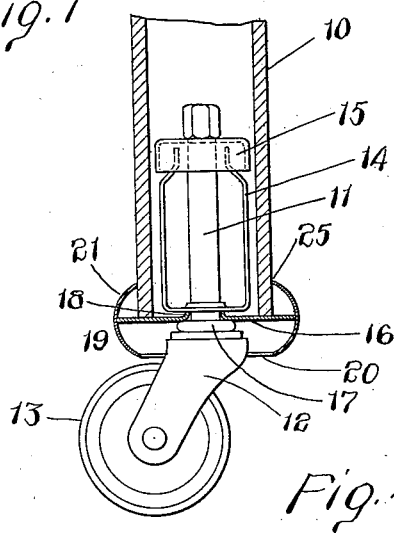
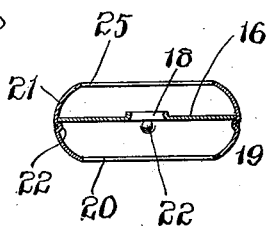
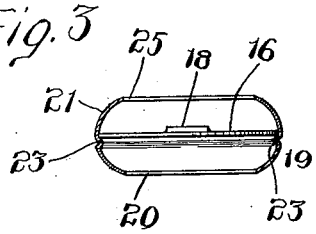
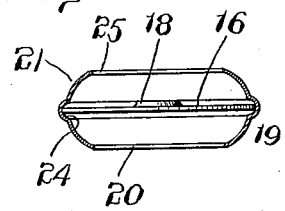
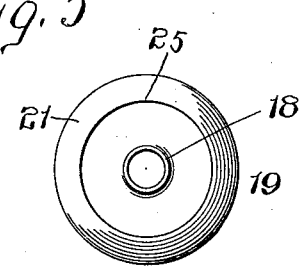
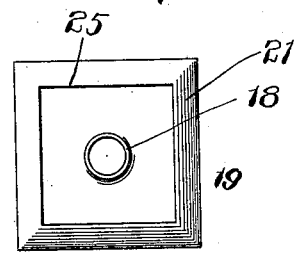
WITNESSES:
H. W. Meade
E. M. Culver
INVENTOR
Harry A. Palmer
BY
A. M. Wooster
ATTORNEY

UNITED STATES PATENT OFFICE.

HARRY A. PALMER, OF MERIDEN, CONNECTICUT, ASSIGNOR TO FOSTER, MERRIAM AND COMPANY, OF MERIDEN, CONNECTICUT, A CORPORATION OF CONNECTICUT.

LEG-MOUNT FOR CASTERS.

1,087,050.  Specification of Letters Patent.  Patented Feb. 10, 1914.

Application filed December 29, 1913. Serial No. 809,183.

*To all whom it may concern:*

Be it known that I, HARRY A. PALMER, a citizen of the United States, residing at Meriden, county of New Haven, State of Connecticut, have invented an Improvement in Leg-Mounts for Casters, of which the following is a specification.

This invention relates to casters especially adapted for tubular furniture legs and has for its object to provide an inexpensive and ornamental leg mount, so called, for casters of this type, which will cover and conceal the lower end of a furniture leg and also the upper end of the horn of a caster and the connection of the horn with the pintle will center the pintle and will also center the caster as a whole relatively to the furniture leg.

With this and other objects in view I have devised the simple and novel leg mount for casters which I will now describe, referring to the accompanying drawings forming a part of this specification and using reference characters to indicate the several parts:

Figure 1 is a view showing a caster in elevation and a furniture leg and my novel leg mount in section; Figs. 2, 3 and 4 are views partly in elevation and partly in section illustrating slightly variant forms of my novel leg mount, and Figs. 5 and 6 are plan views respectively of round and angular forms of my novel leg mount.

10 denotes a tubular furniture leg, 11 a caster pintle, 12 the horn, 13 the wheel, 14 spring arms by which the caster is retained on the leg, 15 a cap for limiting the outward movement of the spring arms, and 16 a plate upon which the leg rests and which centers the pintle. All of these parts are substantially as shown in Letters-Patent No. 1,023,222, granted to me April 16, 1912, with the exception that in my present structure the plate is of appreciably greater diameter than the outside diameter of the leg. The plate rests upon a bearing 17 above the yoke and is provided with a central hole through which the pintle passes freely. This hole is shown as surrounded by an upturned flange 18 upon which the spring arms rest. The lower end of the leg and the upper portion of the horn of the caster are inclosed within and concealed by an ornamental shell 19 which is carried by the plate and gives to the structure as a whole a neat and finished appearance. This shell may be formed in any suitable manner, as by cupping and drawing it from a disk of sheet metal. The cup is drawn with an internal diameter to just receive the plate, which is of appreciably greater diameter than the outside diameter of the leg upon which it is to be used. The bottom of the cup is rounded and given any desired ornamental configuration and extends well down toward the wheel of the caster, a central opening 20 being formed in the bottom of the cup, of sufficient diameter to permit the horn to rotate freely therein. The upper end of the cup is curved inward toward the leg, as at 21, leaving an opening 25 to receive the leg. The engagement of the inturned edge 21 of the cup with the leg centers the caster relatively to the leg and relieves the spring arms from the strain of lateral movement of the leg. In the form illustrated in Fig. 1, the cup is preferably closed tightly about the plate; in the form illustrated in Fig. 2, the cup is provided with inwardly extending bumps or lugs 22 which support the plate; in the form illustrated in Fig. 3, an inwardly extending rib supports the plate, and in the form illustrated in Fig. 4, a groove 24 is formed to receive the edge of the plate. The form illustrated in Fig. 6 differs only in that the shell is made angular instead of round.

Having thus described my invention I claim:—

1. A leg mount for casters comprising a plate having a hole to receive a pintle freely and a shell inclosing and engaging the plate at the greatest diameter of the shell, the upper and lower ends of the shell being closed inward, substantially as described, for the purpose set forth.

2. A caster comprising a pintle, a horn, a combined leg supporting and pintle centering plate through which the pintle passes freely and a shell having at its greatest diameter means for supporting the plate, the upper and lower ends of said shell being closed inward and each provided with a central opening.

In testimony whereof I affix my signature in presence of two witnesses.

HARRY A. PALMER.

Witnesses:
C. F. TEAGLE,
BLAINE COGGINS.

Copies of this patent may be obtained for five cents each, by addressing the "Commissioner of Patents, Washington, D. C."